Figure 1:
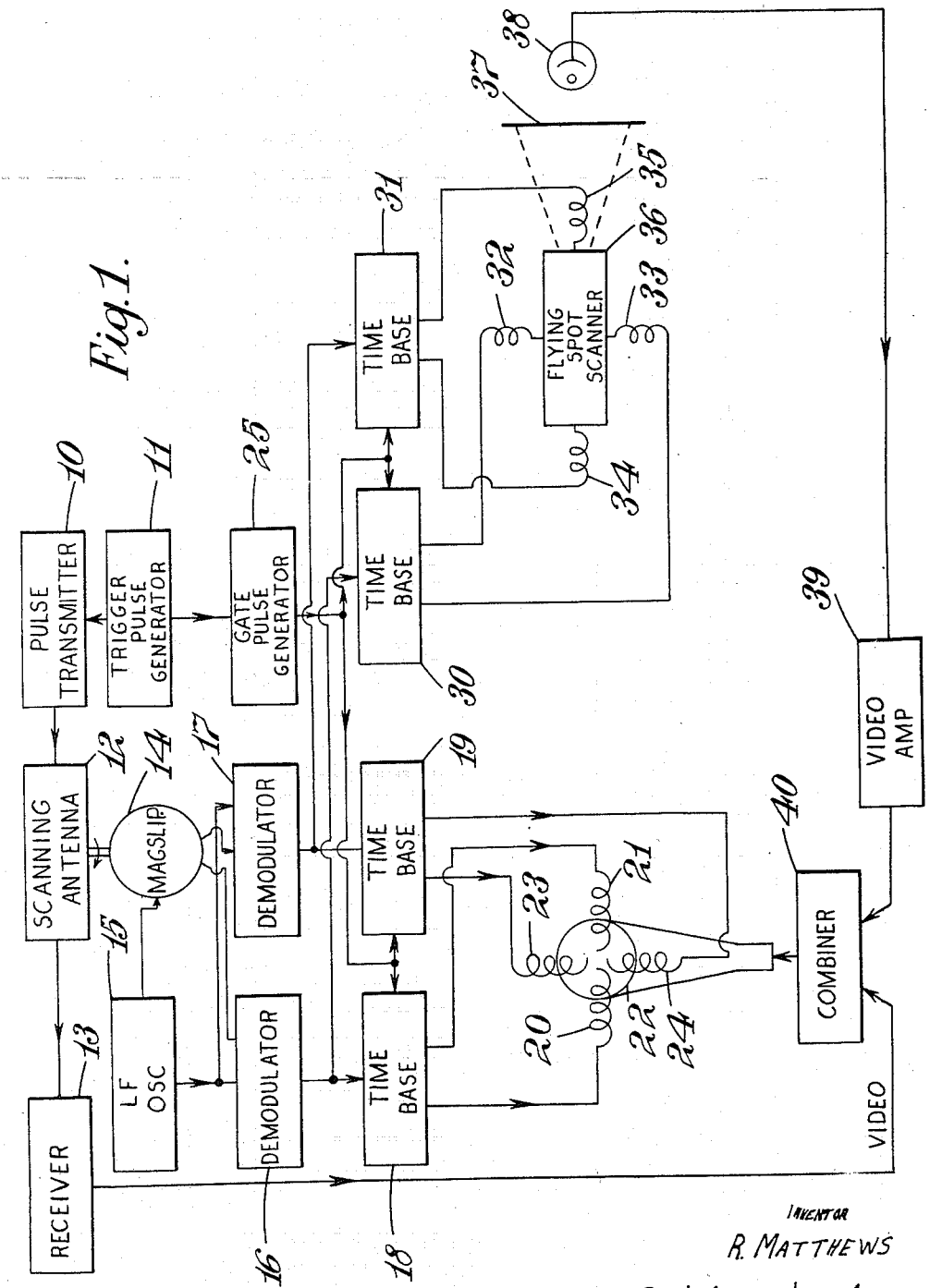

Sept. 22, 1959   R. MATTHEWS   2,905,938
MOVING TARGET RADAR DISPLAY APPARATUS
Filed Oct. 12, 1955   3 Sheets-Sheet 1

INVENTOR
R. MATTHEWS
By Wilkinson & Mawhinney
ATTYS.

Sept. 22, 1959 R. MATTHEWS 2,905,938
MOVING TARGET RADAR DISPLAY APPARATUS
Filed Oct. 12, 1955 3 Sheets-Sheet 2

INVENTOR
R. MATTHEWS
By Wilkinson & Mawhinney
ATTYS.

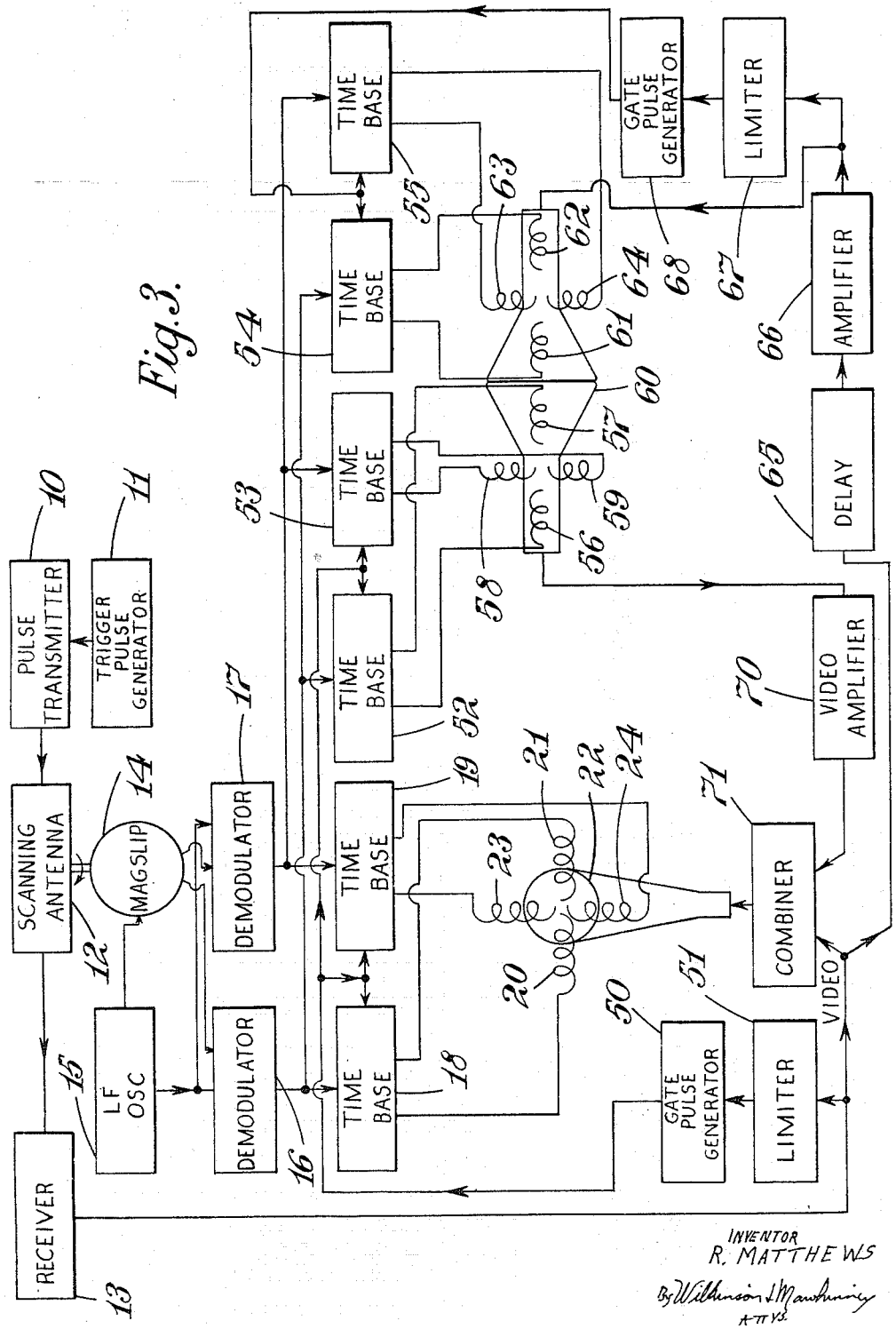

United States Patent Office 2,905,938
Patented Sept. 22, 1959

2,905,938

MOVING TARGET RADAR DISPLAY APPARATUS

Robert Matthews, London, England, assignor to The Decca Record Company Limited, London, England, a British company Application October 12, 1955, Serial No. 540,078

Claims priority, application Great Britain October 13, 1954

11 Claims. (Cl. 343—7.7)

This invention relates to radar display systems of the kind in which echo signals are displayed on a repetitively-scanned trace. The echoes may be displayed as a deflection of the trace as, for example, in A-scope displays or may be shown as a brightness modulation of a trace which is moved across a screen as, for example, in a plan-position-indicator display in which a radial trace is rotated in synchronism with an antenna so that the targets are displayed on the screen at distances from and at angular positions about the centre of rotation of the trace corresponding to the actual ranges and bearings.

It is an object of the present invention to enable any selected or all static targets to be cancelled or substantially reduced in amplitude in a radar display.

According to this invention, in a radar display system having a repetitively scanned trace there is provided a representation of targets to be cancelled from the display or to be reduced in amplitude, scanning means for scanning said representation at the same time as and in synchronism with the display scan to produce corresponding electrical signals and circuit means for applying said signals to the radar display system so as to reduce or cancel the corresponding radar signals. This arrangement enables any selected or all static targets to be reduced in amplitude or cancelled from the screen of the radar display. It will be seen that the invention is equally applicable to displays having a brightness modulated trace and displays having a deflection modulated trace.

In the case of a radar display having a brightness modulated trace on the screen of a cathode ray tube, the scanning means may be arranged to produce signals for mixing with the video signals fed to the grid to cathode circuit of the cathode ray tube. These additional signals will have to be of opposite polarity to the radar display signals. In the case of a radar display having a deflection modulated trace on a cathode ray tube, the signals from said scanning means may be fed to the appropriate deflector means. The primary use of the invention is for the suppression of large areas of signals from static targets such as, for example, from extensive buildings and hills. In such cases it is generally immaterial if the opposing signals do not exactly cancel the corresponding radar display signals, particularly in the case of displays with brightness modulated traces, since, in that case, the small amplitude or thin edge of the remaining echo serves to indicate the unwanted signal faintly thereby preserving the recognisability of the picture. Provided the radar receiver and display system is not saturated, the arrangement of the present invention will enable targets which are not on the representation, e.g. moving targets, to be seen in the areas otherwise obscured by ground clutter.

For a brightness modulated radar display, the aforementioned representation is preferably in a form similar to the radar display. Thus, for example, if the radar display is to be a plan-position-indicator display, then the representation is preferably a similar display showing the targets at distances from and angular distances about a centre of rotation corresponding to their respective ranges and bearings. It will be appreciated, however, that signals derived from such a representation might be fed to a B-scope display as well as to a plan-position-indicator display.

The representation, in one arrangement, is in the form of a photograph of the radar display. Such a photograph might be taken when there are no moving targets so as to show on the photograph only static targets. The photograph may then be scanned by a flying spot scanner to produce the required electrical signals. The photograph may conveniently be a negative in the form of a slide.

Alternatively, it is possible to use a monoscope having a signal plate carrying the required pattern for generating video signals corresponding to a predetermined representation. It will be appreciated, however, that it would be necessary to have a separate monoscope tube for each representation that is required and thus the arrangement would not be so flexible as a system using photographs scanned by a flying spot scanner.

In another arrangement of the present invention, instead of using a photograph for the representation, there is used, as the representation, the previous scan of a separate radar display having a brightness modulated trace which is moved across a screen. It would be possible to use the afterglow of a cathode-ray tube display but preferably a storage tube is used. The writing beam of the storage tube is scanned so as always to be a small distance behind the reading beam, whilst the reading beam is scanned in synchronism with the scanning of the radar display. Thus the reading beam is very nearly one display period (i.e., in the case of a plan position indicator display, one aerial revolution) behind the writing beam. This arrangement will cause the cancellation or reduction from the first display of signals appearing on the previous trace and will hence show only moving targets. Such an arrangement permits of indication of targets moving at very slow speeds, for example, down to about half a mile per hour using a typical radar display system. The lag of the writing beam is preferably just sufficient to prevent inter-action of the reading and writing beams. The amount of delay however, is not critical provided it is sufficient to prevent interaction of the two beams. The required delay in the writing beam may be obtained by feeding the signals through an electrical delay circuit. The trigger pulse for starting the trace for the writing beam is conveniently derived from the trigger pulse for the radar display by use of the same delay circuit so as to ensure that the signals displayed by the writing beam appear in their correct positions of the screen no matter what the actual amount of the delay introduced. Provided the delay is small, the position of the trace of the writing beam on the screen of the storage tube (e.g. in a plan position indicator display, the angular position and centre of rotation) may be controlled by the same control signals as determine the position of the reading beam trace and the trace of the radar display. Differentiating amplifiers may be used, if desired, in the video circuits for the radar display and storage tube.

Figure 2:
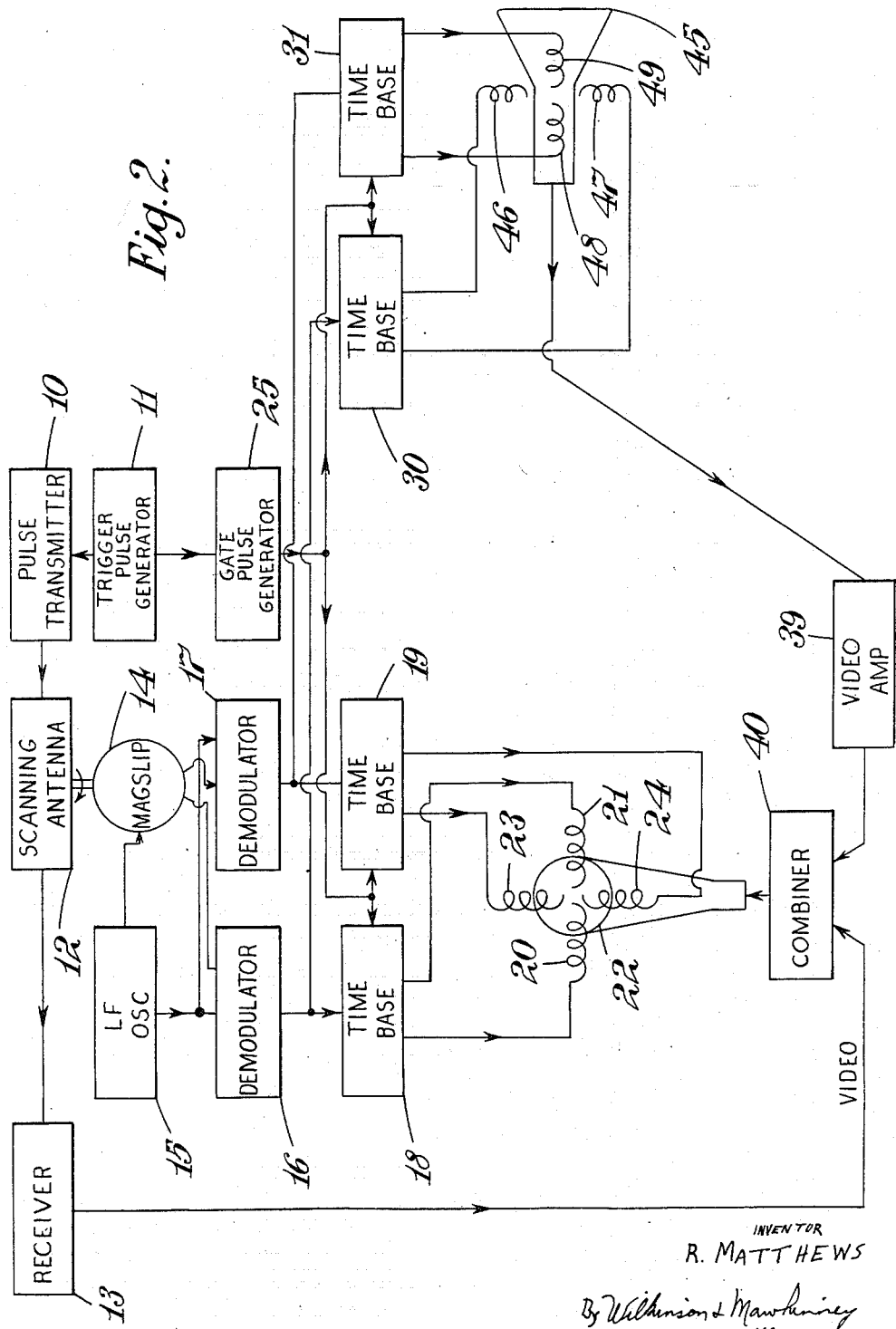

The following is a description of two embodiments of the invention, reference being made to the accompanying drawings in which Figures 1, 2 and 3 are block diagrams of three different forms of radar display apparatus in which static targets are cancelled or reduced in amplitude.

Referring to Figure 1 there is illustrated diagrammatically a pulse radar system having a pulse transmitter 10 of which the pulse recurrence frequency is controlled by a trigger pulse generator 11. The output of the transmitter is radiated by a scanning antenna 12 and the echoes received from targets are fed from this scanning antenna to a receiver 13 which provides a video-frequency output.

The scanning antenna 12 is mechanically coupled to a magslip 14 which resolves a low frequency input signal from an oscillator 15 into sine and cosine components representative of the angular position of the antenna. The two outputs from the magslip 14 are fed respectively to two demodulators 16, 17 which provide direct voltages proportional to the sine and cosine of the angular position of the antenna and these two direct voltages are employed respectively to control the amplitude of saw-tooth currents generated by two saw-tooth time-base generators 18, 19 respectively. The instant of starting at the duration of the saw-tooth currents are determined by gate pulse from a gate pulse generator 25 which is controlled by the trigger pulse generator 11. A demodulator circuit suitable for use in the demodulators 16, 17 is described in British patent specification No. 679,723 and a saw-tooth generator for generating a saw-tooth current of amplitude proportional to a direct input voltage is described in British patent specification No. 679,722. Each of the time-base generators 18, 19 in the arrangement of Figure 1 also includes a paraphrase amplitude so that two saw-tooth outputs of opposite polarity are provided. The two outputs from the time-base generator 18 are fed respectively to a pair of deflector coils 20, 21 of a cathode ray tube 22, and the two outputs from the time-base generator 19 are fed respectively to a second pair of deflector coils 23, 24. This arrangement thus provides a radial scan on the screen of the cathode ray tube which scan is rotated in synchronism with the rotation of the scanning antenna, and, if the video output of the receiver 13 were applied directly to the tube 11 to modulate the beam thereof, a plan-position display would be obtained on the screen.

The outputs from the two demodulators 16, 17 are also fed to a second pair of time-base generators 30, 31 which are similar to the units 18, 19 and which feed four deflector coils 32, 33, 34, 35 controlling the deflection of the beam of a flying-spot scanner 36. All the time-base generators 18, 19, 30, 31 are controlled by the gate pulse generator 25 so as to ensure that they operate in synchronism with one another and hence the beam of the flying-spot scanner will be moved in synchronism with and in a similar manner to the beam of the cathode ray tube 22. The flying-spot scanner is arranged to scan a photograph 37 or other representation of the fixed echoes which it is required to cancel or reduce on the screen of the radar display. In the arrangement shown in Figure 1 the photograph 37 is in the form of a negative and the light from the flying-spot scanner is transmitted therethrough and is picked up by a photo-cell 38. The output from the photo-cell is amplified by a video-frequency amplifier 39 and then applied to one input of a combining unit 40. To the other input of this combining unit is fed the video signals from the receiver 13. The combining unit is arranged so that the signals from the photo-cell 38 are subtracted from the video output of the receiver 13 to give a resultant output from the combining unit 40 which is then applied between the grid and cathode of the cathode ray tube 22 to modulate the brightness of the cathode ray tube beam. It will be seen that with this arrangement the flying-spot scanner will provide output signals representative of the fixed echoes as displayed on the photograph 37 and that these signals are subtracted from the received output so that echoes from static targets would be cancelled or substantially reduced in amplitude on the screen of the cathode ray tube 22.

As is shown in Figure 2, which illustrates a modification of the arrangement of Figure 1, instead of using a flying-spot scanner 36 and photograph 37, a monoscope 45 may be employed having a screen on which a signal plate carrying a required pattern for generating video signals corresponding to a predetermined representation. In Figure 2, the same reference numerals are employed as in Figure 1 to indicate corresponding elements. The only difference between the arrangements of Figures 1 and 2 is the use in Figure 2 of the monoscope 45. The time-base generators 30, 31, feed the four deflector coils 46, 47, 48 and 49 which control the deflection of the monoscope beam. The output from the monoscope is fed to the amplifier 39 and thence, after amplification to the combiner 40 where it is combined with the video signals from the radar receiver 13. The system of Figure 2 operates in a similar manner to that of Figure 1 and serves to cancel or reduce in amplitude on the display echoes corresponding to those represented on the monoscope.

The arrangements of Figures 1 and 2 require representations of the echoes expected from fixed targets. In practice the echoes from fixed targets may vary from time to time, for example, with weather conditions and such arrangements may not therefore provide complete cancellation of all static targets. This difficulty is overcome in the arrangement of Figure 3 in which the cancelling signals are derived from the previous scan of the radar display. Referring to Figure 3 there is provided, as before, a pulse transmitter 10 controlled by a trigger pulse generator 11, a scanning antenna 12, a receiver 13 and a magslip 14 which is fed by a low frequency oscillator 15 and which feeds two demodulators 16, 17 to provide direct voltages proportional to the sine and cosine of the angular position of the antenna. The two demodulators control two time-base generators 18, 19 which in turn by means of coils 20, 21, 23, 24 control the deflection of the beam of the cathode ray tube 22. In the arrangement of Figure 3, however, the time-base generators 18, 19 are controlled by means of a gate pulse from a gate pulse generator 50 which determines the instant of start and duration of the saw-tooth waveforms. This gate pulse generator provides gate pulses synchronised from the received radar ground-wave signals by means of a limiter 51 to which is applied the video output from the receiver 13, the limiter being arranged to separate the large amplitude ground-wave from the other video signals.

The demodulators 16, 17 also control four further time-base generators 52, 53, 54, 55. The two time-base generators 52, 53 feed the four deflector coils 56, 57, 58, 59 controlling the reading beam of a storage-type cathode ray tube 60 and the two time-base generators 54, 55 feed deflector coils 61, 62, 63, 64 controlling the writing beam of the tube 60. The time-base generators 52, 53 are controlled from the gate pulse generator 50 but the time-base generators 54, 55 are triggered at a short time after the other four time-base generators, this delay being effected by means of an electrical delay circuit 65 into which the video output from the receiver 13 is fed. The video signals, after passing through the delay circuit, are amplified by an amplifier 66 and fed to a limiter 67 which separates the large amplitude ground wave from the other video signals. The ground wave signals are fed to a gate pulse generator 68 for generating gate pulses for controlling the start and duration of the saw-tooth waveforms from the time-base generators 54, 55. The output from the amplifier 66 is also used to modulate the writing beam of the storage-type cathode ray tube 60. It will thus be seen that the time-bases for the writing beam are delayed by a short time with respect to the time-bases for the reading beam and for the display tube 22 and that the same delay is also applied to the video signals which are used to modulate the writing beam. The output from the reading beam of the tube 60 is amplified by an amplifier 70 and fed to a combiner 71. This combiner 71 is a subtraction unit in which the output from the amplifier 70 is mixed with the video output from the receiver 13 so that the signals from the amplifier 70 are subtracted from the received signals from the receiver 13 to give an output representing the difference between these two sets of signals. The output from the combiner 71 is applied between the grid and cathode of the tube 22 to modulate the brightness of the beam thereof.

The storage tube 60 is preferably of the type in which the reading beam removes any stored signals but alternatively it is possible to provide a separate cancelling circuit for cancelling all stored signals one per revolution of the antenna.

Heretofore in systems using a storage tube for delaying information by a complete cycle of antenna rotation it has been necessary to write the information on the storage tube in one cycle of antenna rotation and then to read off during the next cycle. While information is being read off, it is not possible to record further incoming information on the storage tube. Such an arrangement thus enables only half the incoming information to be employed, the information being recorded in one cycle and read off in the next. While it is being read off, no use can be made of the incoming radar information. This is a very serious disadvantage since it means losing half the possible information from the radar apparatus. To overcome this difficulty it has been proposed in the past in such systems to use two storage tubes and switching means so that information can be written on to one storage tube while it is being read off the other, the two storage tubes being read in alternate cycles. The arrangement of the present invention avoids any necessity for two storage tubes and enables all the incoming information to be utilized while employing only a single storage tube.

Considered from another aspect, the storage tube of the present invention provides a delay system into which information can be continuously fed and from which the delayed information may be continuously extracted, the delay system giving a delay of exactly one cycle of antenna scanning. This delay is obtained very accurately without however any necessity for any precision stabilized delay circuits such as are commonly used in many types of moving target display radar apparatus.

It will be seen that, in the arrangement of Figure 3, the writing beam of the storage tube is scanned so as to be always a small distance behind the reading beam, whilst the reading beam is scanned in synchronism with the display tube 22. The required information to be stored in the tube is applied to the writing beam with a small delay introduced by the delay unit 65. The delay period, which is a fraction of a cycle of the antenna rotation, is not critical and is merely such as to ensure that there is no interference between the reading and writing beams. Thus, provided adjacent traces on the storage tube do not overlap, the reading beam is very nearly one display period (that is to say one antenna revolution in the case of a plan-position display) behind the writing beam. The beams are scanned in synchronism except that the synchronizing signals for the waveform generators 54, 55 for the writing beam are delayed by the same delay as is applied to the information to be written on the storage tube 60. The reading beam thus moves across the screen slightly ahead of the writing beam and so it requires nearly a complete cycle of the antenna rotation (assuming a rotating antenna radar system) for the reading beam to read information off the storage tube after it has been put on the writing beam. In other words the writing beam is nearly one complete display period behind the reading beam, the difference from one complete display period being the scanning delay deliberately introduced as described above by the delay unit 65. This scanning delay is the same as the delay introduced in the radar information applied to the writing beam and hence the information read from the storage tube 60 by the reading beam is exactly a complete cycle of antenna rotation behind the incoming radar information. This information read by the reading beam is combined with the directly received radar signals in the combiner 71 so as to reduce in amplitude or cancel from the input to the tube 22 signals appearing in the same position on two successive cycles of antenna rotation. However, even if adjacent traces on the storage tube should overlap and the delay in the writing beam is such that the reading beam reads the immediately previously written trace, then the arrangement will operate to reduce in amplitude or cancel signals appearing on the previous trace. In either case the display will show moving targets whilst reducing in amplitude or cancelling static targets. It will be particularly noted that this arrangement only requires a short delay, the period of which is not critical and this delay (which might, for example, be of the order of 10–30 microseconds) may readily be produced by the electrical delay circuit 65. The video signals and the gate pulse for the writing beam time-bases are delayed by exactly the same amount since the gate pulse is obtained from the video signals, and it will be noted that the gate pulses for the time-base generators 18, 19, 52 and 53 are derived from the received signals in the same manner as the gate pulses for time-base generators 54, 55 so ensuring that there is no difference in the timing of the gate pulses apart from the delay introduced by the delay circuit 65.

In the arrangements of each of Figures 1 to 3, the representation is made similar to the required display. This is not essential but it is preferable since it enables similar scanning systems to be employed thus facilitating the obtaining of exactly similar scanning. Furthermore all the time-base generators in each of three embodiments are controlled in amplitude of saw-tooth waveforms by direct voltages obtained from demodulating resolved components obtained from a magslip; this arrangement further assists in enabling a high degree of similarity between the various scans to be obtained.

I claim:

1. A radar display system for displaying radar information from a radar set having a rotating antenna which display system comprises a display cathode ray tube, a storage tube having a screen on which signals are stored by a writing beam and from which signals are read by a reading beam, scanning means for scanning the reading beam in synchronism with the incoming radar information, scanning means for scanning the writing beam in synchronism with the incoming radar information but delayed by a period corresponding to a fraction of a cycle of the antenna rotation with respect to the scanning of the reading beam to prevent interaction of the two beams, an input circuit for applying part of the incoming radar information to modulate the writing beam of the storage tube, a delay unit in said input circuit for delaying the incoming radar signals for said fraction of a cycle, circuit means for applying the signals read by said reading beam so as to reduce the corresponding undelayed part in the next cycle of the incoming radar information on the display cathode ray tube and scanning means for controlling the scanning of the beam of said display cathode ray tube in synchronism with the incoming radar information and exactly in phase with the scanning of the reading beam.

2. A radar display system as claimed in claim 1 wherein said circuit means comprise combining means for combining in a subtractive manner an undelayed part of the incoming radar information with signals read by said reading beam and means for applying the combined signals to said display cathode ray tube to modulate the beam thereof.

3. A radar display system as claimed in claim 2 and having a variable gain amplifier for amplifying the signals read by the reading beam whereby the relative amplitudes of the signals fed to said combining means may be adjusted to cancel static targets on said display cathode ray tube.

4. A radar display system as claimed in claim 1 wherein common scanning control circuits are provided for controlling the scanning rates of the reading beam, the writing beam and the beam of the display tube.

5. A radar display system for displaying radar information from a pulse radar set having a rotating antenna which display system comprises a display cathode ray tube, a storage tube having a screen on which signals are stored by a writing beam and from which signals are read by a reading beam, scanning means for scanning the reading beam in synchronism with the incoming radar information, a delay unit for delaying the incoming radar signals for a period corresponding to a fraction of a cycle of the antenna rotation, an input circuit for applying the delayed radar information from said delay unit to modulate the writing beam of the storage tube, scanning means controlled by the received ground wave signals after passing through said delay unit for scanning the writing beam in synchronism with the incoming radar information but delayed by said fraction of a cycle with respect to the reading beam, which fraction of a cycle is sufficient to prevent interaction of the reading and writing beams, circuit means for applying the signals read by said reading beam and the corresponding undelayed incoming radar information on the display of said display cathode ray tube so that corresponding signals in successive cycles cancel one another and scanning means for controlling the scanning of the beam of said display cathode ray tube in synchronism with the incoming radar information and exactly in phase therewith.

6. A radar display system for displaying radar information from a pulse radar set having a rotating antenna which display system comprises a display cathode ray tube, a storage tube having a screen on which signals are stored by a writing beam and from which signals are read by a reading beam, scanning means controlled by the incoming received ground wave signals for scanning the reading beam in synchronism with the incoming radar information, a delay unit for delaying the incoming radar signals for a period corresponding to a fraction of a cycle of the antenna rotation, an input circuit for applying the delayed radar information from said delay unit to modulate the writing beam of the storage tube, scanning means controlled by the received ground wave signals after passing through said delay unit for scanning the writing beam in synchronism with the incoming radar information but delayed by said fraction of a cycle with respect to the reading beam, which fraction of a cycle is sufficient to prevent interaction of the reading and writing beams, circuit means for applying the signals read by said reading beam and the corresponding undelayed incoming radar information on the display of said display cathode ray tube so that corresponding signals in successive cycles cancel one another and scanning means controlled by the incoming undelayed received ground wave signals for controlling the scanning of the beam of said display cathode ray tube in synchronism with the incoming radar information and exactly in phase therewith.

7. A radar display system as claimed in claim 6 wherein common scanning control circuits are provided for controlling the scanning rates of the reading beam, the writing beam and the beam of the display tube.

8. A radar display system for displaying, as a plan position display, radar information from a pulse radar set having a rotating antenna which display system comprises a display cathode ray tube, a storage tube having a screen on which signals are stored by a writing beam and from which signals are read by a reading beam, resolving means coupled to said antenna for producing sine and cosine direct voltages, representative of the angular position of the antenna, a first pair of sawtooth waveform generators controlled by said sine and cosine voltages from said resolving means to produce respectively two sawtooth waveforms of amplitudes proportional to said sine and cosine voltages and synchronised to start with the transmitted radar pulses, first scanning means coupled to said first pair of sawtooth waveform generators for scanning the reading beam in synchronism with the incoming radar information, a delay unit for delaying the incoming radar signals for a period corresponding to a fraction of a cycle of the antenna rotation, an input circuit for applying the delayed radar information to modulate the writing beam of the storage tube, a second pair of sawtooth waveform generators controlled by said sine and cosine voltages from said resolving means to produce respectively two sawtooth waveforms of amplitudes proportional to said sine and cosine voltages and synchronised by the received ground wave signals after passing through said delay unit to start after the corresponding outputs of said first pair of sawtooth waveform generators with the delay equal to the aforesaid fraction of a cycle, which fraction of a cycle is sufficient to prevent interaction of the reading and writing beams, second scanning means coupled to said second pair of sawtooth waveform generators for scanning the writing beam in synchronism with the delayed radar information, circuit means for substractively combining the signals read by said reading beam and the corresponding undelayed incoming radar information signals in the next cycle of aerial rotation and for applying the combined signals to modulate the beam of said display cathode ray tube, a third pair of sawtooth waveform generators controlled by said sine and cosine voltages from said resolving means to produce respectively two sawtooth wave forms of amplitudes proportional to said sine and cosine voltages and synchronised to start with the transmitted radar pulses and third scanning means coupled to said third pair of sawtooth waveform generators for scanning the beam of said display cathode ray tube in synchronism with the incoming radar information and exactly in phase therewith.

9. A radar display system as claimed in claim 8 wherein synchronising means are provided for synchronising the first and third pairs of waveform generators with the incoming undelayed received ground wave signals.

10. A radar display system as claimed in claim 8 wherein said circuit means for subtractively combining the signals read by said reading beam and the corresponding undelayed incoming radar information signals includes an adjustable gain amplifier for amplifying one of the signals to be combined whereby the relative proportions of the signals when combined may be adjusted.

11. A radar display system for displaying radar information from a radar set having a repetitively scanning antenna system, which display system comprises a display cathode ray tube, a storage tube having a screen on which signals are stored by a writing beam and from which signals are read by a reading beam, scanning means for scanning the reading beam in synchronism with the incoming radar information, scanning means for scanning the writing beam in synchronism with the incoming radar information but delayed with respect to the scanning of the reading beam by a period corresponding to a fraction of a cycle of the antenna scanning to prevent interaction of the reading and writing beams, an input circuit for applying part of the incoming radar information to modulate the writing beam of the storage tube, a delay unit in said input circuit for delaying the incoming signals for said fraction of a cycle, circuit means for applying the signals read by said reading beam so as to reduce the corresponding undelayed part of the next cycle of the incoming radar information on the display of said display cathode ray tube and scanning means for controlling the scanning of the beam of said display cathode ray tube in synchronism with the incoming radar information and exactly in phase with the scanning of the reading beam.

References Cited in the file of this patent
UNITED STATES PATENTS

| | | |
|---|---|---|
| 2,667,634 | Hart | Jan. 26, 1954 |
| 2,667,635 | Hergenrother | Jan. 26, 1954 |
| 2,668,286 | White | Feb. 2, 1954 |
| 2,716,203 | Sen et al. | Aug. 23, 1955 |

FOREIGN PATENTS

| | | |
|---|---|---|
| 644,736 | Great Britain | Oct. 18, 1950 |

OTHER REFERENCES

Jensen: abstract of application Serial Number 161,661, published Nov. 20, 1951, 652 O.G. 892, 893.